(12) United States Patent
Chevalier et al.

(10) Patent No.: US 6,807,517 B2
(45) Date of Patent: Oct. 19, 2004

(54) METHOD TO ESTIMATE THE PARAMETERS OF A PROPAGATION CHANNEL

(75) Inventors: Pascal Chevalier, Courbevoie (FR); Marc Chenu-Tournier, Paris (FR); Claude Adnet, Chatenay-Malabry (FR); Pascal Larzabal, L'Hay les Roses (FR)

(73) Assignee: Thales, Paris (FR)

( * ) Notice: Subject to any disclaimer, the term of this patent is extended or adjusted under 35 U.S.C. 154(b) by 112 days.

(21) Appl. No.: 10/060,249

(22) Filed: Feb. 1, 2002

(65) Prior Publication Data

US 2002/0161538 A1 Oct. 31, 2002

(30) Foreign Application Priority Data

Feb. 2, 2001 (FR) .............................................. 01 01429

(51) Int. Cl.[7] .......................... H04B 15/00; G01R 29/00
(52) U.S. Cl. ..................... 702/189; 702/190; 702/191; 702/196
(58) Field of Search ......................... 702/79, 189, 190, 702/191, 194, 196, 199, 124, 125; 342/417, 440–441, 450, 457; 375/336, 346, 347, 350

(56) References Cited

U.S. PATENT DOCUMENTS

| | | | |
|---|---|---|---|
| 5,752,168 A | | 5/1998 | Monot et al. |
| 5,812,090 A | | 9/1998 | Chevalier et al. |
| 5,870,430 A | * | 2/1999 | Pipon et al. ................. 375/229 |
| 6,118,832 A | | 9/2000 | Mayrargue et al. |
| 6,239,746 B1 | * | 5/2001 | Pipon et al. ................. 342/440 |
| 6,240,098 B1 | | 5/2001 | Thibault et al. |
| 6,243,415 B1 | | 6/2001 | Pipon et al. |
| 6,349,207 B1 | | 2/2002 | Monot et al. |

OTHER PUBLICATIONS

Madyastha r et al; Delay and DOA estimation in CDMA communication systems via maximum likelihood techniques; Jun. 29, 1997; IEEE international symposium on information theory, NewYork, NY; p. 350.*

Raghu Madyastha, et al., Proceedings of the 1997 IEEE International Symposium on Information Theory. ISIT, IEEE, p. 350, XP–000950940, "Delay and DOA Estimation in CDMA Communication Systems Via Maximum Likelihood Techniques", Jun. 29–Jul. 4, 1997.

Mati Wax, et al., IEEE Transactions on Signal Processing, vol. 45, No. 10, pp. 2477–2484, XP–002177398, "Joint Estimation of Time Delays and Directions of Arrival of Multiple Reflections of a Known Signal", Oct. 1997.

Mati Wax, et al., IEEE International Conference on Acoustics, Speech, and Signal Processing Conference Proceedings, vol. 5, pp. 2622–2625, XP–0021777399, "Joint Estimation of Time Delays and Directions of Arrival of Multiple Reflections of a Known Signal", 1996.

Juha Ylitalo, Wireless Personal Communications, vol. 11, No. 1, pp. 31–42, XP–000835060, "Performance of a Digital Beamforming Concept in a GSM1800 Downlink: A Simulation Study", Oct. 1999.

J. Lasenby, et al., IEE Proceedings–F, vol. 138, No. 6, pp. 539–544, XP–000271798, "A Bayesian Approach to High--Resolution Beamforming", Dec. 1991.

* cited by examiner

*Primary Examiner*—Bryan Bui
(74) *Attorney, Agent, or Firm*—Oblon, Spivak, McClelland, Maier & Neustadt, P.C.

(57) ABSTRACT

A method for estimating one or more parameters of a propagation channel, with a priori knowledge of at least one signal, in a system having one or more sensors. The method includes correlating one or more signals received by the sensors with the known signal, sampling the received signals at a sampling period and selecting a number of samples per concatenation, and determining at least one parameter of the propagation channel which enables the most efficient reconstruction of the signals via a maximum likelihood method.

8 Claims, 2 Drawing Sheets

FIG.1

METHOD TO ESTIMATE THE PARAMETERS OF A PROPAGATION CHANNEL

BACKGROUND OF THE INVENTION

1. Field of the Invention

The invention relates to a method for estimating the impulse response of a propagation channel, especially its parameters such as the delay values, the directions of arrival as well as the values of the complex amplitudes associated with these parameters, with an a priori knowledge of the signal.

It is applicable, for example, to the estimation of the parameters of a finite impulse response filter which can be written, though not necessarily so, in specular form, namely a filter that can be written in the form of weighted Diracs.

The invention can be used to estimate propagation channels in the field of radiocommunications but also, generally, it can be applied to any signal filtered by a finite impulse response linear filter.

In a transmission system, especially one using radio waves, a transmitter sends out a signal in a transmission channel to a receiver. The signal that is sent undergoes amplitude and phase fluctuations in the transmission channel. The signal received by the receiver consists of copies of the transmitted signal that are temporally shifted and modified. The fluctuations of the signal and the shifts give rise to a phenomenon known to those skilled in the art as inter-symbol interference. The interference arises especially out of the law of modulation used for transmission and also from the multi-path propagation in the channel.

The received signal generally arises out of a large number of reflections in the channel. The different paths taken by the sent signal thus lead to different delays in the receiver. The impulse response of the channel represents the totality of the fluctuations to which the sent signal is subjected.

The estimation of the propagation channel in a radiocommunications system is useful in several respects, some of which are indicated here below as examples.

The demodulators generally require knowledge of the channels in order to remedy the harmful effects that they have caused, a second point of interest is that of urban or extra-urban localization, for example the principle of emergency localization using the number "911" in the United States Finally, the knowledge of the propagation channels can also serve for the use of smart antennas at reception as well as transmission,

2. Description of the Prior Art

There are various techniques known in the prior art for estimating propagation channels and their parameters.

For example the document by R. Rick and L. Milsteil, "Performance acquisition in mobile ds-cdma systems", IEEE Trans on Communications, Vol: 45 (No: 11):pp: 1466–1476, November 1997, proposes a search for propagation delays by using a bank of non-coherent detectors. The results are proposed for multi-path channels in the presence of Doppler phenomena and inter-cell and intra-cell interference.

The document by R. Rick et L. Milsteil, "Optimal decision strategies for acquisition of spread-spectrum signals in frequency selective fading channels" in IEEE Trans. on Communications, Vol: 46 (No: 5):pp: 686–694, May 1998, discloses an optimal decision rule based on the outputs of the correlators proposed in the document referred to here above. A single-user technique of this kind is limited by interference in the case of multiple-users.

There also exist known ways of using rectangular shaping filters, for example by the method described in one of the following documents:

E. Strom, S. Parkvall, S. Miller, and B. Ottersen, "Propagation delay estimation in asynchronous direct-sequence code-division multiple access systems", IEEE Trans on Communications, Vol: 44:pp: 8–93, January 1996

S. Parkvall, "Near-Far Resistant DS-CDMA Systems: Parameter estimation and Data Detection", PhD thesis, Royal Institute of Technology Stockholm, Sweden, 1996.

S. E. Bensley and B. Aazhang, "Maximum likelihood estimation of a single user's delay for code division multiple access communication systems", Conf. Information Sciences and Systems, 1994.

In the case of shaping filters with a duration greater than a chip time, these different methods are no longer suitable.

Algorithms for the combined estimation of angles of arrival and of the differential delay times, on known and received signals, based on sub-space techniques have been proposed, for example in the document by P. Gounon, "Analyse spatio-temporelle haute résolution à l'aide d'une antenne active", (High Resolution Space-time Analysis Using an Active Antenna) Traitement du Signal (Signal Processing), Vol. 11 (No. 5), pp. 351–360, 1994.

The document by A. J Van der Veen, M. C. Vanderveen, et A. J. Paulraj, "Joint angle and delay estimation using shift-invariance properties", IEEE Sig. Proc Letters, Vol.4 (No.5): pp. 142–145, 1997, discloses methods for the estimation of the physical parameters of propagation by means of methods based on sub-spaces.

Figure 1:
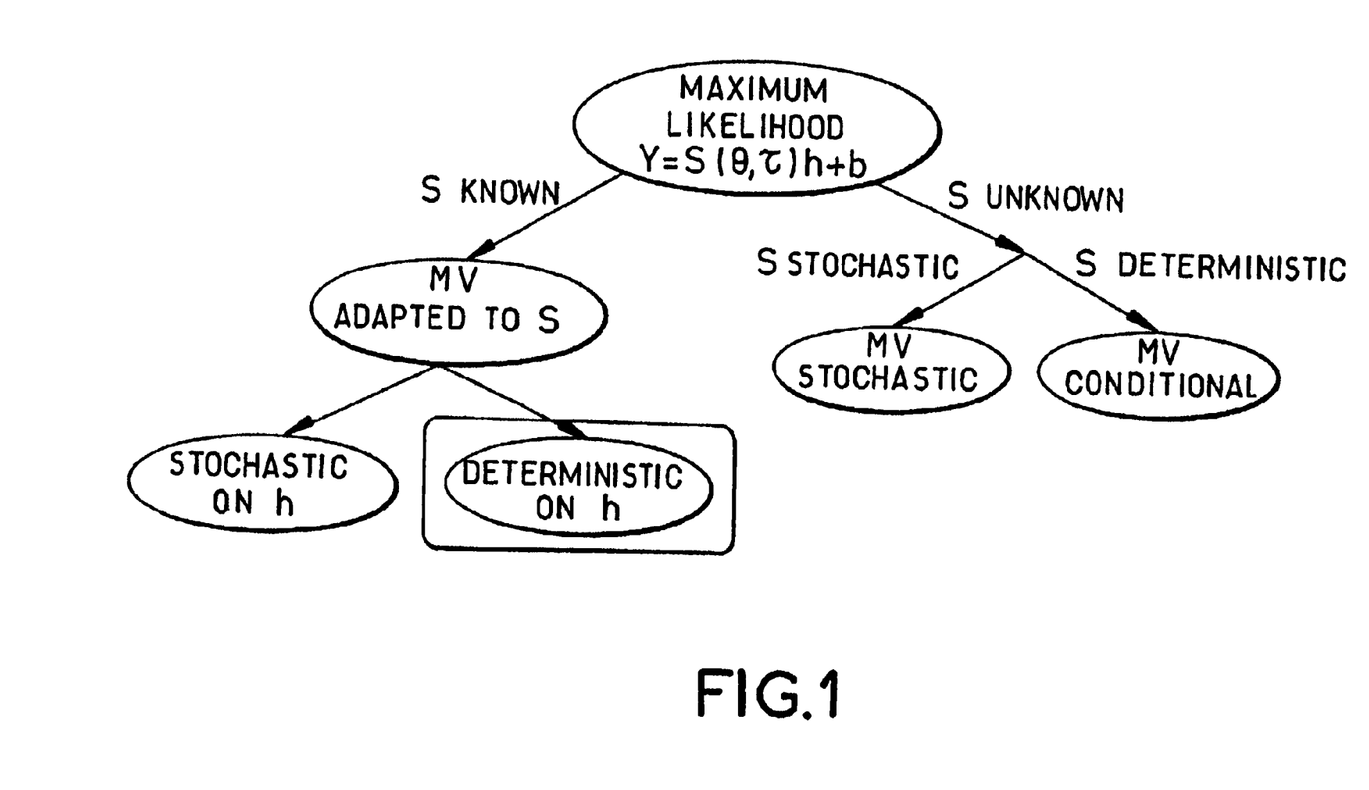
FIG. 1 shows different approaches of estimation of parameters using the Maximum likelihood method FIG. 2 gives a schematic view of a first alternative embodiment of the method according to the invention in which the characteristics of the reception antennas are known.

However, such methods suffer from a deterioration of performance characteristics once the impulse responses of the propagation channels are correlated. This situation occurs especially when the complex amplitudes do not vary with sufficient speed on the covariance matrix of the impulse responses estimated in terms of the least-error squares by means of the signal transmitted, FIG. 1 shows the different techniques of maximum likelihood.

A maximum likelihood method has been proposed, for example, in one of the following references:

J. Grouffaud, "Identification spatio-temporelle de canaux de propagation à trajets multiples", (Space-time Identification of Multi-Path Propagation Channels), PhD thesis, École Normale Supérieure de Cachan, June 1997.

M. Wax and A. Leshem, "Joint estimation of delays and directions of arrival of multiple reflections of a known signal.", IEEE Trans. on Signal Processing, Vol: 45(No: 10):pp: 2477–248, October 1997.

but it does not deal with the MIMO (Multiple Input Multiple Output) context.

The document by P. Graffoulière, "Méthodes actives spatio-temporelles large bande" (Active Wideband Space-Time Methods), published in <<Techniques et performances. Applications En Sonar>> (Techniques and Performance. Sonar Applications), PhD thesis, INPG, March 1997, also discloses a method of estimation based on maximum likelihood but the studies on performance deal only with the case of a single source or of several distinctly separate sources. A similar study is disclosed in the document N. Bertaux, "Contribution à l'utilisation des méthodes du Maximum de Vraisemblance en traitement radar actif" (Contribution to the Use of Maximum Likelihood Methods in Active Radar Processing), PhD thesis, Ecole Normale Supérieure de Cachan, January 2000, for active radar applications in the case of single sources.

SUMMARY OF THE INVENTION

The present invention relates to a method that can be used especially to estimate the parameters of the propagation channel by working on the correlated signals, in selecting a certain number of samples and in searching for the values of the delay parameters and/or directions of arrival, for example, which would enable the most efficient reconstruction of the signal received.

The invention also relates to a method that integrates pulse compression techniques such as pre-processing.

The invention relates to a method for the estimation of one or more parameters of a propagation channel with a priori knowledge of the signal in a system comprising one or more sensors.

The method of the invention comprises the following steps:
- correlating one or more signals x(t) received by the sensors with the known signal c(t),
- sampling the signals at a sampling period Te and selecting a number of samples per concatenation,
- determining at least one parameter of the propagation channel, including $\tau$ or $\theta$, which enables the most efficient reconstruction of the signals x(t) via a maximum likelihood method.

According to one embodiment, the characteristics of the system of sensors are known and comprise for example:
- a correlation step with a known signal c(t) equal to 1,
- the signals received on the antenna being expressed in the form $X=S(\theta,\tau)h+B$, and
- the estimates of the parameters as $\tau$ and $\theta$ being expressed in the following form:

$$\hat{\theta}, \hat{\tau} = \underset{\theta,\tau}{\mathrm{argmin}} \left\| \prod_{S}^{\perp} (\theta, \tau) X \right\|^2$$

$$= \underset{\theta,\tau}{\mathrm{argmin}} \left\{ X^\dagger \prod_{S}^{\perp} (\theta, \tau) X \right\}$$

where $\Pi^{195}{}_S$ is the projector orthogonal to the image generated by the column vectors of $S(\tau, \theta)$.

The characteristics of the system of sensors are for example the response to the antenna.

It may comprise a step for determining the complex amplitudes h of the impulse response of the propagation channel from the estimates of the estimated parameters as $\tau$ and $\theta$.

According to another embodiment, the characteristics of the system of sensors are not known, and the method comprises for example:
- a step for the correlation of the signals received by the network of sensors with a known signal c(t) equal to 1,
- a step in which the signals received are expressed in a concatenated form $Y=\psi(\tau)\alpha+N$ where $\psi(\tau)$ is equal to the convoluted product of the unit matrix $I_N$ and the matrix $$S(\tau) = [s'(\tau_1^1), \ldots s'(\tau_{Pi}^1), \ldots, s(\tau_{pU}^U)],$$

and $\alpha$ contains the responses of the paths of the different users,
- a step for the estimation of the delay vector $\tau$ from $$\hat{\tau} = \underset{\tau}{\mathrm{argmin}} \left\| \prod_{\psi}^{\perp} (\tau) Y \right\|^2$$

$$= \underset{\tau}{\mathrm{argmin}} \, tr \left( Y^\dagger \prod_{\psi}^{\perp} (\tau) Y \right)$$

where $\Pi_\psi^\perp$ is the projector orthogonal to the image generated by the line vectors of $\psi(\tau)$.

The step of correlation of the signals is performed with a signal c(t) different from 1. The characteristics of the system of sensors are known and this correlation step comprises a step for the estimation of the parameters $\tau$ and $\theta$ from:

$$\theta, \tau = \underset{\theta,\tau}{\mathrm{argmin}} X^{\omega\dagger} R_b^{-1} \prod_{\Phi}^{\perp} (\theta, \tau) X^\omega$$

where $$\prod_{\Phi}^{\perp} = I - \Phi(\theta, \tau)(\Phi^\dagger(\theta, \tau) R_b^{-1} \Phi(\theta, \tau))^{-1} \Phi^\dagger(\theta, \tau) R_b^{-1}$$

The invention also relates to a device for estimating one or more parameters of a propagation channel with a priori knowledge of the signal in a system comprising one or more sensors.

The device comprises at least:
- a device adapted to the correlation of the signal received by the sensor or sensors s(t) with a known signal c(t),
- a device adapted to the selection of a number of samples of the signal obtained after the correlation step, and
- a device adapted to the determining of the parameters of the channel by a maximum likelihood method.

The method can be applied, for example, in applications of the MIMO (Multiple Input Multiple output) or SIMO (Single Input Single Output) type.

The invention in particular has the following advantages:
- in the cooperative MIMO context, the estimator, within the framework of a known antenna, makes use of a parametric model of the signals received on the antenna, unlike the deterministic maximum likelihood method which estimates each sample of the signal without any a priori assumptions,
- in limiting the field of analysis in certain cases of application, it leads to a reduction of the size of the data processed, and thus results in faster processing.

BRIEF DESCRIPTION OF THE DRAWINGS

Other features of the invention shall appear from the following description which provides examples of implementation given by way of an illustration, with reference to the appended drawings, of which.

MORE DETAILED DESCRIPTION

In order to provide a clearer understanding of the object of invention, the description is given by way of an illustration that in no way restricts the scope of the invention in the field of mobile radio communications, in a cooperative context in which the receiver has certain information available to it, for example the knowledge, to a certain extent, of the signal sent (a priori knowledge of the signal)

The receiver is constituted for example by N identical and omnidirectional sensors. The signals s(t) received by each of the sensors are regularly sampled at the rate $T_e$. This example does not prevent the application of the method of the invention to other types of receivers.

Before giving a detailed description of the different alternative forms of implementation of the method, we shall recall a few points concerning the modelling of the signals and shall state a few assumptions enabling the implementation of the method.

Modelling of Signals Received on the Reception System

When there are U users (sources), the U signals $s^u(t)$ with $1 \leq u \leq U$ are propagated through different channels before being received by a set of sensors indexed k. The impulse response of the channel between the user u and the sensor k is referenced $h^u_k(t, \tau)$ where t is the instant of arrival of the signal and $\tau$ is its delay.

If we call $h^u_k(t, \tau)$ the vector with the dimension (N×1) whose components are the values $h^u_k(t, \tau)$, with $1 \leq k \leq K$ and K the number of sensors, the models of the received signals can be written in the form (1):

$$x(t) = \sum_{u=1}^{U} s_u(\tau) * h^u(t, \tau) + b(t)$$

where b(t) is the noise vector with the dimension (N×1).

Specular Assumption

Time-related Specular Assumption

The specular model is a widely used model of channels for which it is considered that the paths are perceived by the antenna as being temporally discrete paths.

The transfer function of the channel therefore becomes (2):

$$h^u(t, \tau) = \sum_{p=1}^{P_u} h^u_p(\tau^u_p(t))\delta(t - \tau^u_p(t))$$

with $P_u$ the number of propagation paths of the user u, $h^u_p(\tau^u_p(t))$ the (N×1) vector containing the product of the responses of the antenna to the path p multiplied by the complex amplitude of the path. The received signal can be written in the case of the specular channel (3)

$$x(t) = \sum_{u=1}^{U} \sum_{p=1}^{P_u} h^u_p(\tau^u_p(t))s^u(t - \tau^u_p(t)) + b(t)$$

Calibrated Antenna

If the antenna is calibrated, assuming that the signals reaching the antenna have a negligible angular dispersion and the assumption that the signals are narrowband signals is met, the received signal is modelled by (4):

$$x(t) = \sum_{u=1}^{U} \sum_{p=1}^{P_u} a(\theta^u_p)h^u_p(\tau^u_p(t))s^u(t - \tau^u_p(t)) + b(t)$$

where $\theta^u_p$ is the direction of arrival of the path p of the user u, $h^u_p(\tau^u_p(t))$ is the complex gain of the path p of the user u received on the first sensor.

The previously made assumption (concerning the specularity of the direction of arrival) is not restrictive in the case of a base station in height. If the specularity is not sufficient, the model may be modified by adding a lobe width in the direction of arrival which will be estimated by the method proposed in the invention by adding the parameters of this lobe to the parameters to be estimated.

The different variants of the method according to the invention use the maximum likelihood method, for which various approaches to the estimation of parameters have been given in FIG. 1.

First Alternative Embodiment: Calibrated Antenna

A first alternative embodiment of the method according to the invention uses a maximum likelihood method adapted to the signals sent, when these signals sent are partly known, and the antenna response for all the directions of arrival is known.

Figure 2:
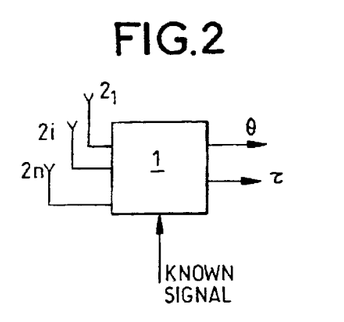

FIG. 2 shows a block diagram where the processing block 1, comprising for example a microprocessor, adapted to implementing the method according to the invention, receives firstly the different signals received by the antennas 2i as well as a known signal corresponding to the signal sent.

At output of the processing block, the method according to the invention has at least estimates of the direction of arrival θ and delay vectors τ which, for example, are used in order to deduce therefrom the impulse response of the channel h(t), for a given user or for all the users.

The signals received on the antenna array are delayed, expanded and, possibly, frequency-transposed versions of the signals sent by the users present in a cell (or propagation channel). These signals are therefore expressed as a linear combination of a set of known basic functions whose parameters are to be extracted.

The method is presented in the general context of parametric estimation of the angles θ and of the delays τ or for any antenna whatsoever constituted by N identical and omnidirectional sensors. The signals are sampled regularly at the rate $T_e$. It is assumed that the number of paths are known and that, if this is the case, the number is determined by using a method of detection of the number of sources by which is possible to obtain the number of paths, described for example in the following references.

J. J. Fuchs, "Estimation of the number of signals in the presence of unknown correlated sensor noise", IEEE Trans on Signal Processing, Vol 40 (No.: 5) pages 351–360, 1994;

J. Gouffraud, P. Larzabal and H. Clergeot, "Méthodes à Haute résolution pour le traitement d'antenne et l'analyse spectrale" (High-resolution methods for antenna processing and spectral analysis) in <<Sélection d'ordre de modèle>>, Editions Hermes, February 1998, Chapter 6;

H. Akaike, "A new look at the statistical model identification", IEEE Trans. On Automatic Control, Vol 19 (No. 6), December 1974, M. Wax and T. Kailath, "Detection of signals by information theoric criteria" de M. Wax et T. Kailath, IEEE Trans.on ASSP, Vol 33(No.2), pages 387–392, April 1985.

The steps implemented in the algorithm according to the invention remain valid when the number of sources is overestimated.

Modelling

The signal x(t) (equation (4)) received by the array of sensors 2i is sampled at the rate $T_e$, during a period $t=[T_e, N_eT_e]$ with Ne being the number of samples or number of observations during which the complex amplitudes of the impulse response for a user u and a path p, $h_p^u(\tau_p^u(t))$ are considered to be constant.

These $N_e$ observations with the dimension N×1 are concatenated in the vector X with the dimension $N_e$N×1: $X=[x(T_\theta)^T, \ldots ,x(N_\theta T_\theta)^T]^T$ (5) where the exponent T designates the transpose.

We define the vector B with the dimension $N_e$N×1 containing the concatenation of the samples of the noise during the same period by (6):

$$B=[b(T_\theta)^T, \ldots ,b(N_\theta T_\theta)^T]^T$$

Finally, $s^u(\tau_p^u)$ is taken to denote the vector with the dimension $N_e$×1 corresponding to the signal sent by the user u, delayed by $(\tau_p^u$ and sampled:

$$s^u((\tau_p^u)=[s^u(T_e-(\tau_p^U), \ldots ,s^u(N_eT_e-(\tau_p^u)]^T \quad (7)$$

The vector of the concatenations of the signals received can therefore be written as follows (8):

$$X = \sum_{u=1}^{U}\sum_{p=1}^{P^u} h_p^u(\tau_p^U)(s^u(\tau_p^U) \otimes a(\theta_p^u)) + B$$

where $\otimes$ is Kronecker's product

Let $S(\theta,\tau)$ be the matrix $$N_eN \times P\left(P = \sum_{u=1}^{U} P^U\right)$$

of the delay-direction vectors defined as follows (9):

$$S(\theta, \tau) = [[s^1(\tau_1^1) \otimes a(\theta_1^1)], \ldots , [s^u(\tau_p^u) \otimes a(\theta_p^u)], \ldots , [s^U(\tau_{P^u}^U) \otimes a(\theta_{P^u}^U)]]$$

where:
  θ is the P-sized real vector of the directions of arrival.
  τ is the P-sized real vector of the delays, (P being the number of paths)

The equation of the signals received on the antenna can therefore be written as: $X=S(\theta,\tau)h+B$ (10) where h is the P×1 complex vector of the amplitudes.

This formulation has the value of expressing the observations as a linear model that is a function of the complex amplitudes h and of the noise.

It must be clearly noted that this is a MIMO (multiple input multiple output) modelling, grouping together all the signals of all the users.

It is not necessary to know all the signals sent. For example, in mobile communications, sequences of known signals are sent periodically, resulting in a known signal. In the radar or in radio altimetry, for example, the transmitted pulse is known.

Log-likelihood

The complex amplitudes h are considered to be unknown but deterministic. In order to simplify the explanation of the invention without, however, limiting it, the signals $s^u(t)$ forming $S(\theta,\tau)$ are considered to be perfectly known, apart from the parameters θ,τ. This leads to an observation model (10) where only the additive noise vector is random, with a Gaussian probability density, represented by (11):

$$P\{X|\sigma^2, h, \theta, \tau\} = \frac{1}{\pi^{N_eN}\sigma^{2N_eN}}\exp\left(-\frac{1}{\sigma^2}(X - S(\theta, \tau)h)^\dagger(X - S(\theta, \tau)h)\right)$$

The log-likelihood of the observations is therefore (12):

$$L(X|\sigma^2, h, \theta, \tau) = -N_eN\log(\pi\sigma^2) - \frac{1}{\sigma^2}\|X - S(\theta, \tau)h\|^2$$

Estimator of the Parameters $\sigma^2$, h, θ, τ

Through the separability of the parameters $\sigma^2$, h, θ, τ, the expression of the log-likelihood (12) authorizes the analytical determining of the vector of the complex amplitudes h and of the power of the noise $\sigma^2$ as a function of θ and τ. These estimates are both obtained by cancelling the derivatives of the log-likelihood respectively with respect to $\sigma^2$ and with respect to h. Their expressions are respectively (13) and (14):

$$\hat{\sigma}^2 = \frac{1}{N_eN}\|X - S(\theta, \tau)h\|^2$$

and $$\hat{h}=(S^\dagger(\theta, \tau)S(\theta, \tau))^{-1}S^\dagger(\theta, \tau)X$$

By substituting the values of h and of $\sigma^2$ in the log-likelihood (12), the expression gets simplified and the estimates of θ and τ are given by (15)

$$\hat{\theta}, \hat{\tau} = \underset{\theta,\tau}{\mathrm{argmin}}\|X - S(\theta, \tau)(S^\dagger(\theta, \tau)S(\theta, \tau))^{-1}S^\dagger(\theta, \tau)X\|.$$

In letting $\Pi_S^\perp$ denote the projector orthogonal to the image generated by the column vectors of $S(\theta, \tau)$ (16)

$$\prod_s^\perp (\theta, \tau) = I - S(\theta, \tau)(S^\dagger(\theta, \tau)S(\theta, \tau))^{-1}S^\dagger(\theta, \tau)$$

The estimates are the solutions of (17)

$$\hat{\theta}, \hat{\tau} = \underset{\theta,\tau}{\mathrm{argmin}}\left\|\prod_s^\perp (\theta, \tau)X\right\|^2$$

$$= \underset{\theta,\tau}{\mathrm{argmin}}\left\{X^\dagger \prod_s^\perp (\theta, \tau)X\right\}$$

These estimated values are then used respectively in the expressions (13) and (14) to determine the power of the noise and the impulse response of the propagation channel.

The criterion introduced in (17) is referenced hereinafter in the text by $$L(\theta, \tau) = X^\dagger \prod_s^\perp (\theta, \tau)X$$

Figure 3:
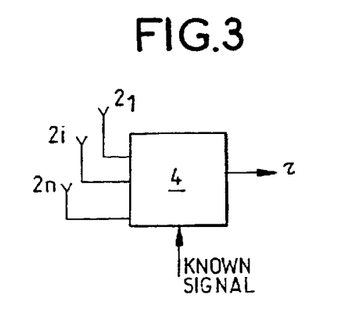
FIG. 3 is a drawing of a second alternative embodiment in which the characteristics of the reception antennas are not known, FIG. 4 gives a schematic view of another variant of the method comprising a preliminary step that can be applied to the methods described in FIGS. 2 and 3 here above.

Implementation of the Method According to the Invention in the Case of a Non-calibrated Antenna FIG. 3 gives the schematic view of an exemplary implementation of the method in the case where the characteristics of the receiver or the antenna are not known. The antenna is formed by several sensors, whose response is not known, and is often designated by the expression "unstructured antennas".

The antennas $2i$ receive the signals that are transmitted to a processing block 14 adapted to implementing the steps of the method, this block itself receiving a known signal.

The processing block, which is equipped for example with a microprocessor programmed accordingly, delivers at least the estimated value of the delay vector $\tau$ and the estimated value of the impulse response of the propagation channel.

Modelling

The received signal is expressed in the form of the equation (4) and is sampled at the rate Te on a period of time $\tau=[Te, NeTe]$ in which the complex amplitudes of the impulse response of the propagation channel $h_p''(\tau_p''(t))$ may be considered to be constant or substantially constant. These Ne samples with a dimension N×1 are concatenated in a vector Y with a dimension NeN×1 such as (18):

$$Y = \left[ \underbrace{x_i(T_e), \ldots, x_i(N_e T_e)}_{\text{sensor 1}}, \ldots, \underbrace{x_N(T_e), \ldots, x_N(N_e T_e)}_{\text{sensor N}} \right]^T$$

Where $x_i(nTe)$ is the sample n of the sensor i.

Similarly, the NeN×1 sized vector N contains the concatenation of the noise samples (19).

$$N = \left[ \underbrace{b_i(T_e), \ldots, b_i(N_e T_e)}_{\text{sensor 1}}, \ldots, \underbrace{b_N(T_e), \ldots, b_N(N_e T_e)}_{\text{sensor N}} \right]^T$$

Where $b_i(nTe)$ is the noise sample n of the sensor with an index i.

The signal Y can be written (20)

$$Y = \psi(\tau)\alpha + N$$

where the matrix $(N_e N \times NP)\psi$ is built from the different values $s''(\tau_p'')$ as follows (21):

$$\psi(\tau) = I_N \otimes S(\tau)$$

where $S(\tau)$ is the matrix $(N_p \times P)$ such as (22):

$$S(\tau) = [s^1(\tau_1^1), \ldots, s^1(\tau_{P_1}^1), \ldots, s(\tau_{pU}^U)]$$

$\alpha$ contains the responses of the sensors to the different paths of the different users (23):

$$\alpha = \left[ \underbrace{h_{1,1}^1(\tau_1^1), \ldots, h_{p,1}^u(\tau_p^u), \ldots, h_{pU,1}^U(\tau_{pU}^U), \ldots, h_{pU,N}^U(\tau_{pU}^U)}_{\text{sensor 1}} \right]^T =$$

$$[h_1^T, \ldots, h_N^T]^T$$

with:

$$h_i = [h_{1,i}^1(\tau_1^1), \ldots, h_{p,i}^U(\tau_p^U), \ldots, h_{pU,i}^u(\tau_{pU}^u)]$$

The complex amplitudes are always assumed to be constant during the phase of estimation of the parameters.

The modelling of the received signals given by the equation (20) provides us with an affine model. As above, this expression takes account of the signals of all the users.

Log-likelihood

The complex amplitudes $\alpha$ are considered in this case as being unknown but deterministic. The signals that come into play in $\Psi(t)$ are assumed to be known apart from the variables $\tau$. This leads to a model where only the noise N is random, with Gaussian components and with a probability density (25):

$$P\{Y|\sigma^2, \alpha, \tau\} = \frac{1}{\pi^{N_e N} \sigma^{2N_e N}} \exp\left( -\frac{1}{\sigma^2} tr((Y - \Psi(\tau)\alpha)^\dagger (Y - \Psi(\tau)\alpha)) \right)$$

The log-likelihood is then given by (26)

$$L(Y|\sigma^2, \alpha, \tau) = -N_e N \log(\pi \sigma^2) - \frac{1}{\sigma^2} \|Y - \Psi(\tau\alpha)\|^2$$

Estimator of the Parameters $\sigma^2$, $\alpha$, $\tau$

As in the case of the maximum likelihood adapted to the signals received with a known antenna as explained here above, the analytical expressions of the complex amplitudes $\alpha$ as well as the power of the noise $\sigma^2$ may be expressed as a function of the set of parameters of the delay vectors $\tau$.

This can be obtained for example by respectively cancelling the derivatives of the log-likelihood with respect respectively to $\alpha$ and to $\sigma^2$.

We obtain the expression (27)

$$\hat{\sigma}^2 = \frac{1}{NeN} \|Y - \Psi(\tau)\alpha\|^2$$

and (28)

$$\hat{\alpha} = (\Psi^\dagger(\tau)\Psi(\tau))^{-1}\Psi^\dagger(\tau)Y = \Psi^\#(\tau)Y$$

By replacing $\alpha$ and $\sigma^2$ by their estimates, the log-likelihood gets simplified and the estimator of $\tau$ is (29)

$$\hat{\tau} = \arg\min_\tau \|Y \to \Psi(\tau)(\Psi^\dagger(\tau)\Psi(\tau))^{-1}\Psi^\dagger(\tau)Y\|^2$$

If $$\prod_\Psi^\perp (\tau)$$

denotes the projector that is orthogonal to the images generated by the line vectors of $\psi(\tau)$ (30):

$$\prod_\Psi^\perp (\tau) = I - \Psi(\tau)(\Psi^\dagger(\tau)\Psi(\tau))^{-1}\Psi^\dagger(\tau)$$

The estimate of $\tau$ is given by (31)

$$\hat{\tau} = \arg\min_\tau \left\| \prod_\Psi^\perp (\tau) Y \right\|^2$$

$$= \arg\min_\tau tr\left( Y^\dagger \prod_\Psi^\perp (\tau) Y \right)$$

The two alternative embodiments explained here above deal with signals sampled at output of the sensor or again for a signal correlated with a known signal having a value 1. The matrices to be processed have a size NeN×P.

According to another alternative implementation of the method which can be applied in the case of a calibrated antenna as well as that of a non-calibrated antenna. the method according to the invention uses correlated signals.

Figure 4:
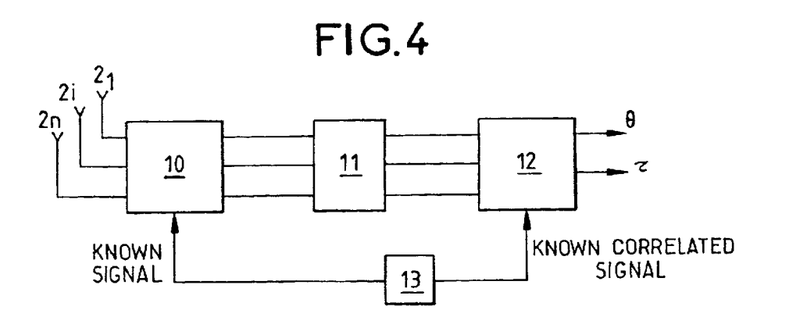

FIG. 4 shows a block diagram in which a correlator 10 receives, firstly, the signals received by the antennas and, secondly, the known signal.

The correlator 10 has a number of outputs identical to the number of inputs, each signal $s_i(t)$ that reaches an antenna being correlated by a known signal c(t). The different correlated signals si(t)*ci(t) where i is the index of the centre are then transmitted to a device 11 adapted to the selection of a number of samples, especially in order to work on a time interval defined beforehand. The signals that have been correlated and belong to the chosen time interval are then transmitted to a processing unit 12 comprising, for example, a microprocessor suited to estimating the values θ and τ, when the characteristics of the antenna are known or the value of τ for an antenna having unknown characteristics. From these values, it is possible to determine the estimates of the impulse response of the propagation channel.

The correlator 10 may be of the analog or digital type, the sampling steps being performed before or after the correlation step.

The processing block also receives the sent signal, itself correlated for example by means of a correlator 13.

When a known time interval is used, it is useful to know the time of reception at the block as well as the length of the channel.

The signals considered in the method correspond to the signals output after correlation by the filter matched with the transmitted signals.

Method for an Antenna whose Characteristics are Known

In this part, the same assumptions are used as in the previous part explained in the case of an antenna for which the parameters are known. We shall again consider the signals to be known and shall examine only the case of the user ω in order to simplify the presentation. This model can immediately be extended to the MIMO (Multiple input Multiple Output) context.

Modelling

By correlating the signals received at each sensor with the signal of the user ω, we get (32):

$$y^\omega(\tau) = \left(\sum_{u=1}^{U}\sum_{p=1}^{p^u} a(\theta_p^u)h_p^u(\tau_p^u)s^u(t-\tau_p^u) + b(t)\right) * s^{\omega*}(-t)$$

$$= \sum_{p=1}^{p^u} a(\theta_p^u)h_p^u(\tau_p^u)(s^\omega(t-\tau_p^u)*s^\omega(-t)) + (b(t))*s^\omega(-t)$$

By limiting the data processed to the part "containing" the propagation channel at output of the correlation, the complexity is greatly reduced because the size of the matrices used is diminished.

By concatenating in the filtered samples at output of the sensors on a time interval N1, the signal X can be modelled as follows (33):

$$X = \Phi(\theta, \tau)h + b$$

$$X = [y^{1^T}(T_e), \ldots, y^{U^T}(N_lT_e)]^T$$

where $$b^\omega = [\{(b(t)+b'(t))^T * s^{\omega*}(-t)\}_{t=T_e}, \ldots, N_lT_s]^T$$

and $$h^\omega = [h_1^\omega, \ldots, h_{p\omega}^\omega]^T$$

with $$\Phi(\theta, \tau) = [\Phi_1, \ldots, \Phi_{p\omega}]$$

$$\Phi_p = [\Phi_p^T(T_e), \ldots, \Phi_p^T(N_lT_e)]^T$$

and $$\Phi_p(t, \theta) = (s^\omega(t-\tau_p^u)*s^{\omega*}(-t)) \otimes a(\theta)$$

The noise $b^\omega$ follows a normal law of covariance $\sigma_T R_b$, where the matrix $R_b = R_s^\omega I_N$. $R_s^\omega$ is the covariance matrix of the vector (34):

$$s^\omega = [s^\omega(T_e), \ldots, s^\omega(N_lT_e)]^\dagger$$

The likelihood of the signal $X^\omega$ is given by (35):

$$P(X^\omega|\Phi(\theta,\tau), h^\omega, \sigma_T^2, R_b) =$$

$$\frac{1}{\pi^{N_lN}\sigma_T^{2N_lN}|R_b|}\exp\left(-\frac{1}{\sigma_T^2}(X^\omega-\Phi(\theta,\tau)h^\omega)^\dagger R_b^{-1}(X^\omega-\Phi(\theta,\tau)h^\omega)\right)$$

whence the log-likelihood (36):

$$L(X^\omega|\Phi(\theta,\tau), h^\omega, \sigma_T^2, R_b) =$$

$$-N_lN\log(\pi\sigma_T^2) - \log(|R_b|) - \frac{1}{\sigma_T^2}\left\|R_b^{-\frac{1}{2}}(X^\omega - \Phi(\theta,\tau)h^\omega)\right\|^2$$

By cancelling the derivatives of the log-likelihood with respect to $\sigma^2$ and with respect to $h^\omega$, we obtain the estimators of $\sigma^2$ and $h^\omega$ (37).

$$\hat{\sigma}_T^2 = \frac{\left\|R_b^{-\frac{1}{2}}(X^\omega - \Phi(\theta,\tau)h^\omega)\right\|^2}{N_lN}$$

and $$\hat{h}^\omega = (\Phi^\dagger(\theta,\tau)\Phi(\theta,\tau))^{-1}\Phi^\dagger(\theta,\tau)X^\omega$$

By replacing $\sigma^2$ and $h^\omega$ by their expression in (36) we obtain the estimator sought for the space-time parameters θ and τ (38); (39)

$$\theta, \tau = \operatorname*{argmin}_{\theta,\tau} X^\omega R_b^{-1}\prod_\Phi^\perp(\theta,\tau)X^\omega$$

where $$\prod_\Phi^\perp = I - \Phi(\theta,\tau)(\Phi^\dagger(\theta,\tau)R_b^{-1}\Phi(\theta,\tau))^{-1}\Phi^\dagger(\theta,\tau)R_b^{-1}$$

The estimated space-time parameters are used for example to determine the estimate of the impulse response of the propagation channel.

Non-calibrated Antenna

In this part, we shall look at a reduced maximum likelihood method with an unknown antenna. The approach used will be identical to the preceding one. We shall give only the model of the signal, the log-likelihood and the estimators.

Modelling

The received signal is filtered by $s^{\omega*}(-f)$ (40):

$$X^\omega(\tau) = \left(\sum_{u=1}^{U}\sum_{p=1}^{p^u} h^u(\tau_p^u)s^u(t-\tau_p^u) + b(t)\right) * s^{\omega*}(-t)$$

$$= \sum_{p=1}^{p^u} h^u(\tau_p^u)(s^\omega(t-\tau_p^u)*s^\omega(-t)) + (b(t)+b'(t))*s^\omega(-t)$$

By concatenating the samples at output of the sensors and then the vectors obtained, we get (41):

$$Y^\omega = S\alpha^\omega + n^\omega$$

$$Y^\omega = [x_1^{\omega T}(T_e), \ldots, x_1^{\omega T}(N_l T_e), \ldots, x_N^{\omega T}(N_l T_e)]^T$$

where $$n^\omega = [\{\{(b_i(t) + b_i'(t)) * s^\omega(-t)\}_{\tau = T_e, \ldots, N_l T_e}\}_{i=1, \ldots, N}]$$

$$\alpha^\omega = [h_{1,1}{}^\omega, \ldots, h_{p\omega,1}{}^\omega, \ldots, h_{p\omega,N}{}^\omega]^T$$

and $$S(\tau) = [S_1, \ldots, S_{P\omega}]$$

with $$S_p = [S_p(T_e), \ldots, =S_p(N_l T_e)]^T$$

and $$S_p(t) = s^\omega(t - \tau_p{}^\omega) * s\omega(-t)$$

The noise $n^\omega$ follows a standard law of covariance $\sigma_T^2 R_n$ where the matrix $R_n = I_N \otimes R_{S^\omega}$.

The likelihood of the signal $Y^\omega$ is given by (42):

$$P(Y^\omega | S(\tau), \alpha^\omega, \sigma_T^2, R_n) = \frac{1}{\pi^{N_l N} \sigma_T^{2N_l N} |R_n|} \exp\left(-\frac{1}{\sigma_T^2}(Y^\omega - S(\tau)\alpha^\omega)^\dagger R_n^{-1}(X^\omega - S(\tau)\alpha^\omega)\right)$$

whence the log-likelihood (43):

$$L(Y^\omega | S(\tau), \alpha^\omega, \sigma_T^2, R_n) = -N_l N \log(\pi \sigma_T^2) - \log(|R_n|) - \frac{1}{\sigma_T^2} \left\|R_n^{-\frac{1}{2}}(Y^\omega - S(\tau)\alpha^\omega)\right\|^2$$

By cancelling the derivative of the log-likelihood with respect to $\sigma_T^2$ and with respect to $\alpha^\omega$, we obtain the estimators of $\sigma_T^2$ (43) and of $\alpha^\omega$ (44):

$$\hat{\sigma}_T^2 = \frac{\left\|R_n^{-\frac{1}{2}}(Y^\omega - S(\tau)\alpha^\omega)\right\|^2}{N_l N}$$

and $$\hat{\alpha}^\omega = (S(\tau) R_n^{-1} S(\tau))^{-1} S(\tau) R_n^{-1} X^\omega$$

By replacing in (42) $\hat{\sigma}_T^2$ and $\hat{\alpha}^\omega$ by their expression, we find an estimator for the parameter $\tau$ (45):

$$\hat{\tau} = \mathrm{argmin}_\tau Y^\omega R_n^{-1} \prod_S^\perp (\tau) Y^\omega$$

where $$\prod_S^\perp = I - S(\tau)(S(\tau) R_n^{-1} S(\tau))^{-1} S(\tau) R_n^{-1}$$

The estimated value of the delay $\tau$ is then used for example to estimate the value of the impulse response of the propagation channel.

The different alternative modes of implementation of the method according to the invention, can be applied in many fields of signal processing. In communications systems, it is often necessary to know the propagation channel in order to demodulate the signals transmitted.

In view of spectral congestion and the growing demand from users, future systems will have several users communicating simultaneously in the same frequency band. Consequently, the techniques proposed here in the MIMO context have a direct application.

Similarly, the technique of filter estimation with reduction of complexity can be applied in the MIMO and SIMO (Single Input Multiple Output) context.

These techniques are also applicable to radar processing. They can be used in a multiple-target or single-target context with echos Similarly, in radio altimetry, several echoes of the sent signal may be received and all of them have to be estimated.

Without departing from the framework of the invention, the invention may take account of the Doppler effect. For this purpose, one method consists for example in estimating the speeds by minimizing a multidimensional function that integrates all the parameters of the model, other than the complex amplitudes and the noise power.

The method according to the invention can be applied especially in a UMTS telecommunications system comprising an array of antennas.

What is claimed is:

1. A method for estimating one or more parameters of a propagation channel with a priori knowledge of a signal c(t) in a system comprising one or more sensors, the method comprising:

correlating a signal or signals x(t) received by the one or more sensors with the signal c(t);

sampling the signal or signals x(t) after correlation at a sampling period Te and selecting a number of samples per concatenation; and determining propagation channel parameters $\tau$ and $\theta$, which enable a most efficient reconstruction of the signals x(t) received by the one or more sensors using a maximum likelihood method, wherein characteristics of the system of sensors are known,
the signal c(t) is equal to 1,
the signals x(t) received on an antenna are expressed in a form X=S($\tau$, $\theta$)h+B, and
estimates of the parameters $\tau$ and $\theta$ are expressed in the form:

$$\hat{\theta}, \hat{\tau} = \mathrm{argmin}_{\theta,\tau} \left\| \prod_S^\perp (\theta, \tau) X \right\|^2$$

$$= \mathrm{argmin}_{\theta,\tau} \left\{ X^\dagger \prod_S^\perp (\theta, \tau) X \right\}$$

where $$\prod_S^\perp$$

is a projector orthogonal to an image generated by the column vectors of $S(\theta,\tau)$.

2. A method for estimating one or more parameters of a propagation channel with a priori knowledge of a signal c(t) in a system comprising one or more sensors, the method comprising:

correlating a signal or signals x(t) received by the one or more sensors with the signal c(t);

sampling the signal or signals x(t) after correlation at a sampling period Te and selecting a number of samples per concatenation;

determining propagation channel parameters $\tau$ and $\theta$, which enable a most efficient reconstruction of the signals x(t) received by the one or more sensors using a maximum likelihood method; and determining complex amplitudes h of an impulse response of the propagation channel from estimates of the parameters $\tau$ and $\theta$.

3. A method for estimating one or more parameters of a propagation channel with a priori knowledge of a signal c(t) in a system comprising one or more sensors, the method comprising:

correlating a signal or signals x(t) received by the one or more sensors with the signal c(t);

sampling the signal or signals x(t) after correlation at a sampling period Te and selecting a number of samples per concatenation; and determining propagation channel parameters $\tau$ and $\theta$, which enable a most efficient reconstruction of the signals x(t) received by the one or more sensors using a maximum likelihood method, wherein
characteristics of the system of one or more sensors are not known,
the signal c(t) is equal to 1,
concatenated form $Y=\Psi(\tau)\alpha+N$, where $\Psi(\tau)$ is equal to the convoluted product of the unit matrix $I_N$ and a matrix $S(\tau)=[s^1(\tau_1^1),\ldots,s^1(\tau_{P_1}^1),\ldots,s(\tau_{P'}^U)]$, and $\alpha$ contains responses of paths of different users, and delay vectors $\tau$ are estimated from $$\hat\tau = \arg\min_\tau \left\|\prod_\Psi^\perp(\tau)Y\right\|^2$$
$$= \arg\min_\tau tr\left(Y^\dagger \prod_\Psi^\perp(\tau)Y\right)$$

where $$\prod_\Psi^\perp$$

is a projector orthogonal to an image generated by line vectors of $\Psi(\tau)$.

4. A method for estimating one or more parameters of a propagation channel with a priori knowledge of a signal c(t) in a system comprising one or more sensors, the method comprising:

correlating a signal or signals x(t) received by the one or more sensors with the signal c(t);

sampling the signal or signals x(t) after correlation at a sampling period Te and selecting a number of samples per concatenation; and determining propagation channel parameters $\tau$ and $\theta$, which enable a most efficient reconstruction of the signals x(t) received by the one or more sensors using a maximum likelihood method, wherein
the signal c(t) is different from 1, and
characteristics of the system of one or more sensors are known and parameters $\tau$ and $\theta$ are estimated from $$\theta, \tau = \arg\min_{\theta,\tau} X^\omega R_b^{-1} \prod_\Phi^\perp (\theta, \tau) X^\omega$$

$$\prod_\Phi^\perp = I - \Phi(\theta, \tau)(\Phi^\dagger(\theta, \tau)R_b^{-1}\Phi(\theta, \tau))^{-1}\Phi^\dagger(\theta, \tau)R_b^{-1}.$$

5. A method for estimating one or more parameters of a propagation channel with a priori knowledge of a signal c(t) in a system comprising one or more sensors, the method comprising:

correlating a signal or signals x(t) received by the one or more sensors with the signal c(t);

sampling the signal or signals x(t) after correlation at a sampling period Te and selecting a number of samples per concatenation; and determining propagation channel parameters $\tau$ and $\theta$, which enable a most efficient reconstruction of the signals x(t) received by the one or more sensors using a maximum likelihood method, wherein
the signal c(t) is different from 1, and
characteristics of the system of one or more sensors is unknown, and a delay vector is expressed by $$\hat\tau = \arg\min_\tau Y^\omega R_n^{-1} \prod_S^\perp (\tau) Y^\omega$$

where $$\prod_S^\perp = I - S(\tau)(S(\tau)R_n^{-1}S(\tau))^{-1}S(\tau)R_n^{-1}.$$

6. A method according to one of the claims 5, applied in MIMO (Multiple Input Multiple Output) or SIMO (Single Input Multiple Output) type applications.

7. A device for estimating one or more parameters of a propagation channel with a priori knowledge of a signal c(t) in a system comprising one or more sensors s(t), the device comprising:

a device adapted to correlate a signal or signals x(t) received by the one or more sensors s(t) with the signal c(t);

a device adapted to sample the signal or signals x(t) after correlation at a sampling period Te and selecting a number of samples per concatenation; and a device adapted to determine parameters of the propagation channel, including $\tau$ or $\theta$, which enables a most efficient reconstruction of the signal or signals x(t) by a maximum likelihood method, wherein
characteristics of the system of sensors are known,
the signal c(t) is equal to 1,
the signals x(t) received on an antenna are expressed in a form $X=S(\tau,\theta)h+B$, and
estimates of the parameters $\tau$ and $\theta$ are expressed in the form:

$$\hat{\theta}, \hat{\tau} = \underset{\theta,\tau}{\operatorname{argmin}} \left\| \prod_S^\perp (\theta, \tau) X \right\|^2$$

$$= \underset{\theta,\tau}{\operatorname{argmin}} \left\{ X^\dagger \prod_S^\perp (\theta, \tau) X \right\}$$

where $$\prod_S^\perp$$

is a projector orthogonal to an image generated by the column vectors of $S(\theta,\tau)$.

8. A radiocommunications receiver comprising the device according to claim 7.

* * * * *